United States Patent [19]

Visscher et al.

[11] Patent Number: 5,465,021

[45] Date of Patent: Nov. 7, 1995

[54] ELECTROMECHANICAL DISPLACEMENT DEVICE AND ACTUATOR SUITABLE FOR USE IN SUCH A ELECTROMECHANICAL DISPLACEMENT DEVICE

[75] Inventors: Albert Visscher; Marinus P. Koster; Johannus W. Weekamp, all of Eindhoven, Netherlands

[73] Assignee: U. S. Philips Corporation, New York, N.Y.

[21] Appl. No.: 369,578

[22] Filed: Jan. 6, 1995

Related U.S. Application Data

[63] Continuation of Ser. No. 131,269, Oct. 1, 1993, abandoned.

[30] Foreign Application Priority Data

Oct. 2, 1992 [EP]  European Pat. Off. ............. 92203027

[51] Int. Cl.⁶ .................................................. H01L 41/08
[52] U.S. Cl. .................................................... 310/328
[58] Field of Search ............................................. 310/328

[56] References Cited

U.S. PATENT DOCUMENTS

| | | | |
|---|---|---|---|
| 3,902,084 | 8/1975 | May, Jr. | 310/328 |
| 4,468,583 | 8/1984 | Mori | 310/328 |
| 4,570,096 | 2/1986 | Hara et al. | 310/328 |
| 4,714,855 | 12/1987 | Fujimoto | 310/328 |
| 4,757,223 | 7/1988 | Ueyama | 310/328 |
| 4,874,979 | 10/1989 | Rapp | 310/328 |
| 4,947,077 | 8/1990 | Murata | 310/328 |
| 5,034,647 | 7/1991 | Ohtsuka | 310/328 |
| 5,182,484 | 1/1993 | Culp | 310/328 |
| 5,237,238 | 8/1993 | Berghaus et al. | 310/328 |

FOREIGN PATENT DOCUMENTS 0231176  2/1991  Japan ................................. 310/328

*Primary Examiner*—Thomas M. Dougherty
*Attorney, Agent, or Firm*—Edward Blocker

[57] ABSTRACT

An electromechanical displacement device (81) provided with a holder (90), an element (45) displaceable relative to the holder (90), and an actuator (83) connected to the holder (90) by which the element (45) can be displaced relative to the holder (90). The actuator (83) is provided with at least a first and a second clamping member (B, A) which can be clamped alternately against the element (45) under a mechanical pretensioning force $F_k$, at least one clamping member (A) being provided with at least one piezoelectric, electrostrictive or magnetostrictive clamping element (61). The actuator (83) is further provided with a piezoelectric, electrostrictive or magnetostrictive transport element (69', 69") by which the distance between the clamping members (A, B) can be changed. When the first clamping member (B) is clamped against the element (45) under the mechanical pretensioning force $F_k$ while the second clamping member (A) is disengaged therefrom, activation of the clamping element (61) transfers the mechanical pretensioning force $F_k$ to the second clamping member (A), so that the second clamping member (A) is clamped against the element (45) under the mechanical pretensioning force $F_k$, while the first clamping member (B) is disengaged therefrom.

9 Claims, 5 Drawing Sheets

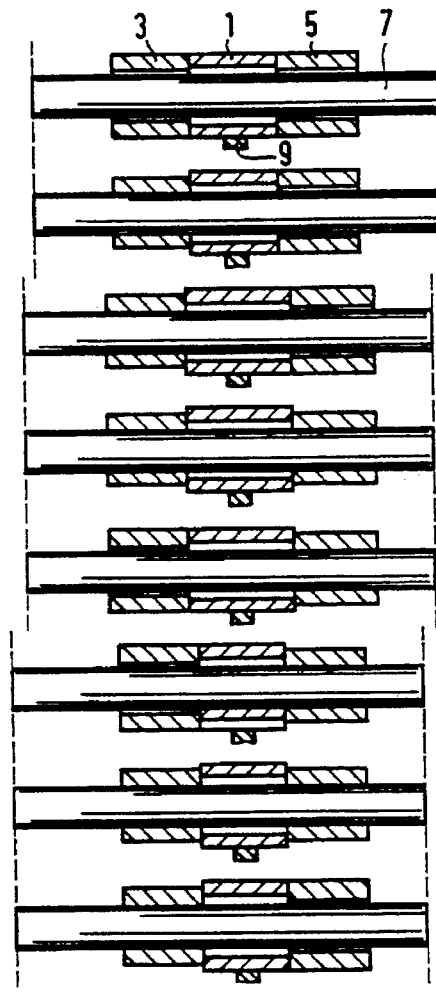
FIG. 1a PRIOR ART
FIG. 1b PRIOR ART
FIG. 1c PRIOR ART
FIG. 1d PRIOR ART
FIG. 1e PRIOR ART
FIG. 1f PRIOR ART
FIG. 1g PRIOR ART
FIG. 1h PRIOR ART
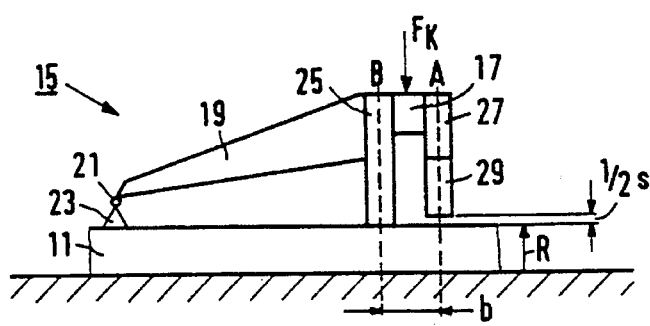
FIG. 2a
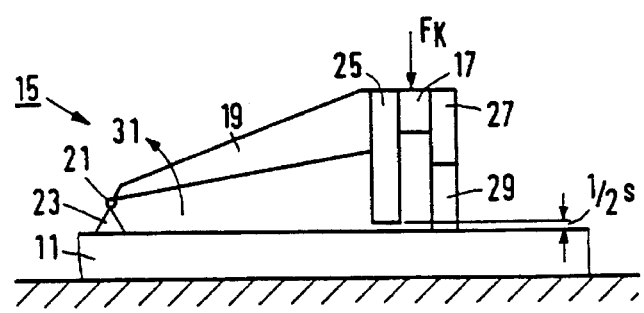
FIG. 2b

20

ELECTROMECHANICAL DISPLACEMENT DEVICE AND ACTUATOR SUITABLE FOR USE IN SUCH A ELECTROMECHANICAL DISPLACEMENT DEVICE

This is a continuation of application(s) Ser. No. 08/131,269 filed on Oct. 1, 1993 now abandoned.

BACKGROUND OF THE INVENTION

The invention relates to an electromechanical displacement device provided with a holder, an element displaceable relative to the holder, and an actuator connected to the holder and capable of displacing the element relative to the holder, which actuator is provided with at least a first and a second clamping member which are arranged separately from one another and can be clamped against the element, while at least one clamping member is provided with at least one clamping element of transducer material, and which actuator is further provided with a transport element of transducer material by which the distance between the clamping members can be changed while one clamping member is connected to the element with clamping force.

The invention further relates to an actuator suitable for use in such an electromechanical displacement device.

The term "clamping member" in the present Patent Application is understood to mean at least one surface which can be clamped against the element to be displaced in that the distance between the surface and the element can be reduced. A "series of clamping members" means at least two surfaces between which the element to be displaced can be clamped in that the distance between the surfaces can be reduced.

The term "transducer material" is understood to mean a material which changes its shape under the influence of a change in an electric or magnetic field, for example, piezoelectric materials, electrostrictive materials or magnetostrictive materials.

In an electromechanical displacement device known from U.S. Pat. No. 3,902,084 and depicted in FIGS. 1a–1h, an annular piezoelectric transport element 1 is connected on opposing sides to two annular piezoelectric clamping elements 3, 5 (two clamping members) which can be clamped against a shaft 7. The piezoelectric transport element 1 is connected to a holder 9.

The piezoelectric elements can be separately activated by a voltage source. Activation reduces the internal diameters of the clamping elements 3 and 5, while it increases the length of the transport element 1 in axial direction. In situation (a) depicted in FIGS. 1a–1h, all piezoelectric elements are deactivated. In situation (c), clamping element 3 is activated and clamps around the shaft 7. In situation (c), subsequently, transport element 1 is activated, whereby it increases in length, so that the clamping element 3 together with the shaft 7 is moved to the left. Then clamping element 5 is activated (d), so that the elements 3 and 5 are simultaneously clamped against the shaft. After this the clamping element 3 is deactivated (e) so that the clamping element 3 no longer clamps against the shaft 7. Subsequently the transport element 1 is deactivated (f), so that it decreases in length and the clamping element 5 together with the shaft 7 is moved to the left. The two elements 3 and 5 are activated in situation (g), and in situation (h) the clamping action of element 5 is discontinued, upon which the situation is identical again to the situation (b). To move the shaft further to the left, the steps (b) to (g) should be repeated as often as is necessary. The diameter changes of annular piezoelectric clamping elements which can be realised in practice are only small, so that high requirements are imposed on the accuracy of the shaft diameter, or else the clamping elements may be continually clamped around the shaft or may be incapable of being clamped around the shaft at all.

Temperature changes and the accompanying expansion of the shaft and the clamping elements are disadvantageous for a good clamping action of the displacement device. In the U.S. Patent mentioned above, accordingly, it is suggested to manufacture the shaft from a material which has the same coefficient of thermal expansion as the clamping elements. The clamping force between a clamping element and the shaft depends inter alia on the local diameter of the shaft, which is not constant owing to tolerances and which is therefore not exactly known. Furthermore, the device described in the U.S. Patent is sensitive to wear. If the internal diameter of the annular element increases by a few tenths of a μm owing to wear, a good clamping action has already become impossible. Therefore, the displacement device must be manufactured to a high accuracy and be very wear-resistant. The greatest distance over which the element is displaceable is determined by the length over which the element has the required high accuracy. In view of manufacturing costs, this length will be chosen to be limited in practice, so that the distance over which the element can be moved is also limited.

The invention has for its object to provide a displacement device with which the said disadvantages are avoided.

SUMMARY OF THE INVENTION

The electromechanical displacement device is for this purpose characterized in that the first clamping member is clamped against the displaceable element with a mechanical pretensioning force exerted on the actuator while the second clamping member is disengaged from this element, and the mechanical pretensioning force is transmitted to the second clamping member through activation of the clamping element, whereby the second clamping member is clamped against the displaceable element with mechanical pretensioning force while the first clamping member is disengaged from this element.

The mechanical pretensioning force may be provided by means of a spring or a mechanical construction. The mechanical pretensioning force provides a constant clamping force of the clamping members on the element to be displaced which is comparatively independent of the accuracy of the dimension of the element present between the clamping members. As a result, the displacement device is no longer sensitive to expansion of the element and the clamping members resulting from temperature changes. The clamping members are moved toward the element under the mechanical pretensioning force in the case of wear of the clamping members, and it remains possible to press the clamping members against the element to be displaced. A high manufacturing accuracy of the element has also become unnecessary for a good clamping action of the clamping members. The distance over which the element can be displaced is no longer limited by manufacturing accuracies.

The mechanical pretensioning force in the displacement device according to the invention always presses a single clamping member or a single series of clamping members against the element at any time. To have the other clamping member or series of clamping members take clamping action, the distance between the clamping member or series of clamping members pressing against the element is increased by means of the clamping element, so that the clamping member or series of clamping members becomes disengaged from the element. At that moment, the mechanical pretensioning force presses the other clamping member or series of clamping membes against the element to be displaced. In principle, there is never more than a single clamping member or single of clamping members which presses against the element.

In the displacement device described in the cited U.S. Patent, the clamping force is exerted by the clamping elements, while the dimensional changes of the clamping elements and the shape of the shaft are determining factors for a good clamping action. If the clamping action is to be switched between the clamping elements, both clamping elements should be subject to a dimensional change each time.

In the device described in the US Patent, the absolute dimension of the element to be displaced at the area of the clamping members is important for a good clamping action, whereas in the device according to the invention the dimensional difference of the element between the area of the first clamping member and the area of the second clamping member is important for a good clamping action.

An embodiment of the displacement device according to the invention is characterized in that the spacing between the clamping members is smaller than the length of the transport element.

The transport element does not lie between the clamping members here, as in the device according to the cited US Patent, but next to or outside these clamping members.

As a result, the spacing between the clamping members may be chosen to be as small as possible, so that the dimensional difference of the element to be displaced between the area of the first clamping member and at the area of the second clamping member is small in practice. The rigidity of the actuator between the clamping members can then be made comparatively great in a simple manner. In the case of a comparatively small rigidity of the actuator, in fact, there is the risk that the necessary spacing between the disengaged clamping member and the element to be displaced is lost owing to deformations of the actuator and both clamping members remain permanently in contact with the element to be displaced.

Since the transport element is not situated between the clamping members, the length of the transport element has no influence on the spacing between the clamping members, and the length of the transport element may be determined independently of the desired displacement of the element.

A further embodiment of the displacement device according to the invention, in which the element is a round shaft, is characterized in that the actuator is provided with two series of clamping members which are interconnected by means of a ring which concentrically surrounds the shaft and which is provided with plate-shaped bridges which lie between clamping members of a single series, which are flexible in radial direction, and by which the pretensioning force is transmitted to the clamping members, and in that the actuator is provided with plate-shaped coupling pieces situated between clamping members of different series and flexible in axial direction.

The interspacing in axial direction between the clamping members is reduced to a minimum here, so that dimensional tolerances in axial direction of the shaft have a minimum influence on the operation of the displacement device.

Owing to the plate-shaped coupling pieces, a relative axial displacement of the clamping members of the different series relative to one another remains possible. Each clamping member is displaceable in axial direction to beyond the other clamping member. As a result, the displacement device as it were "creeps" over the shaft.

An alternative embodiment of the displacement device according to the invention is characterized in that the actuator is provided with only one single clamping element by which the clamping members are alternately clamped against the element to be displaced. A comparatively inexpensive displacement device is obtained in this way. This embodiment is especially suitable for displacing flexible elements which are deformable between the clamping members.

A yet further embodiment of the displacement device according to the invention is characterized in that the transport element is provided with a carrier connected to the holder and with two elements of equal length made of transducer material, one of these elements being situated between the carrier and the first clamping member, while the other element is situated between the carrier and the second clamping member. The use of two elements of transducer material in the transport element renders possible a displacement of the element to be displaced between each alternation of the clamping force from the one to the other clamping member, by which a regular displacement is obtained seen in time. Each element can be fastened to the carrier in a simple manner owing to the use of two elements.

It is noted that in the cited U.S. Patent the holder is fastened to the centre of the piezoelectric transport element 1. Expansion of the piezoelectric transport element at the area of the holder, however, is rendered difficult by this.

BRIEF DESCRIPTION OF THE DRAWINGS

The invention is explained in more detail with reference to the drawing in which FIGS. 1a–1h diagrammatically show an electromechanical displacement device according to the prior art, FIGS. 2a and 2b diagrammatically show the clamping principle according to the invention.

DETAILED DESCRIPTION OF THE PREFERRED EMBODIMENT

Figure 3:
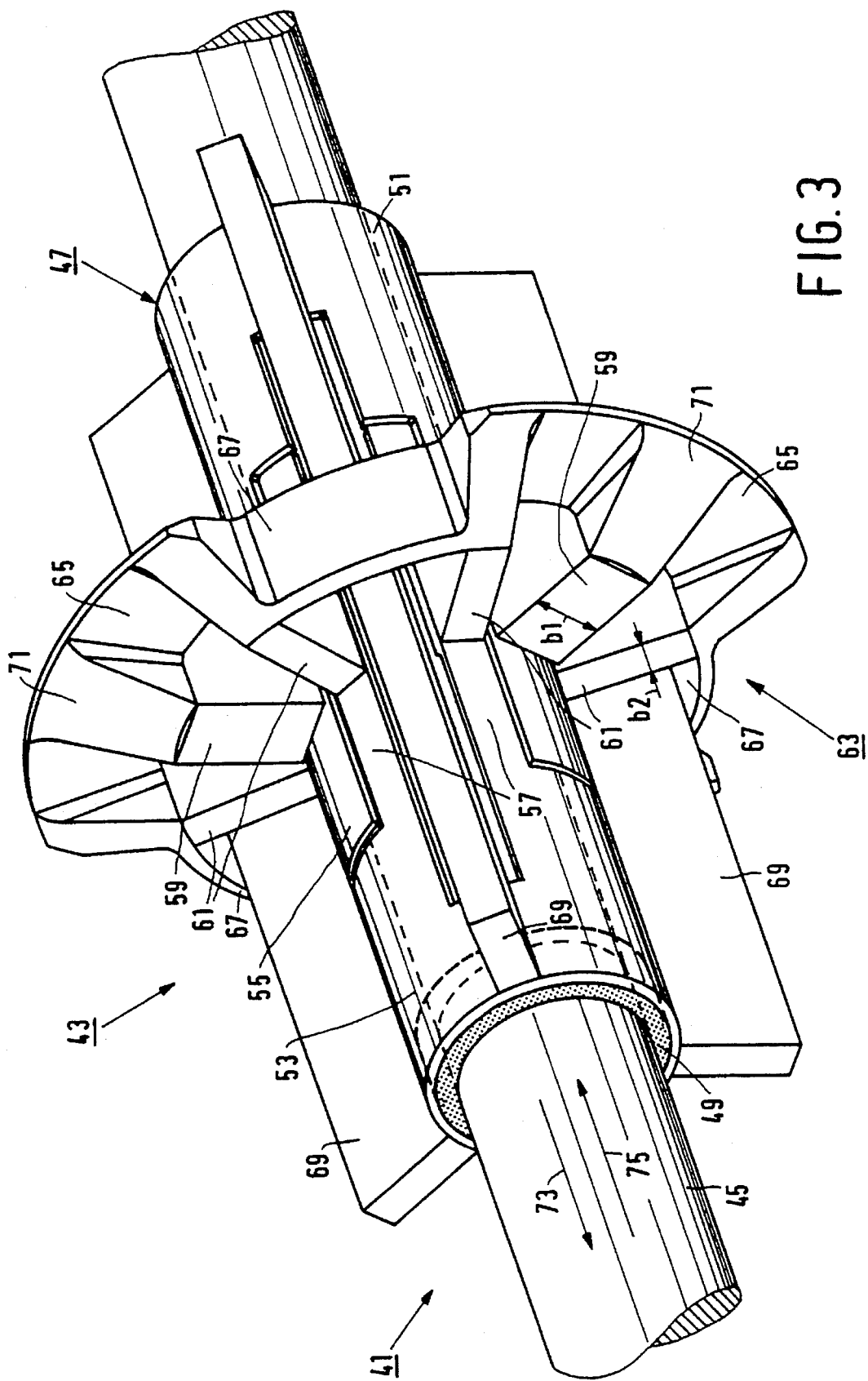
FIG. 3 shows a first embodiment of a displacement device according to the invention.

Corresponding components are given the same reference numerals in the various Figures.

FIGS. 1a–1h shows a device known from U.S. Pat. No. 3,902,084 whose operation was described in the introductory paragraphs of the present document.

Figure 4:
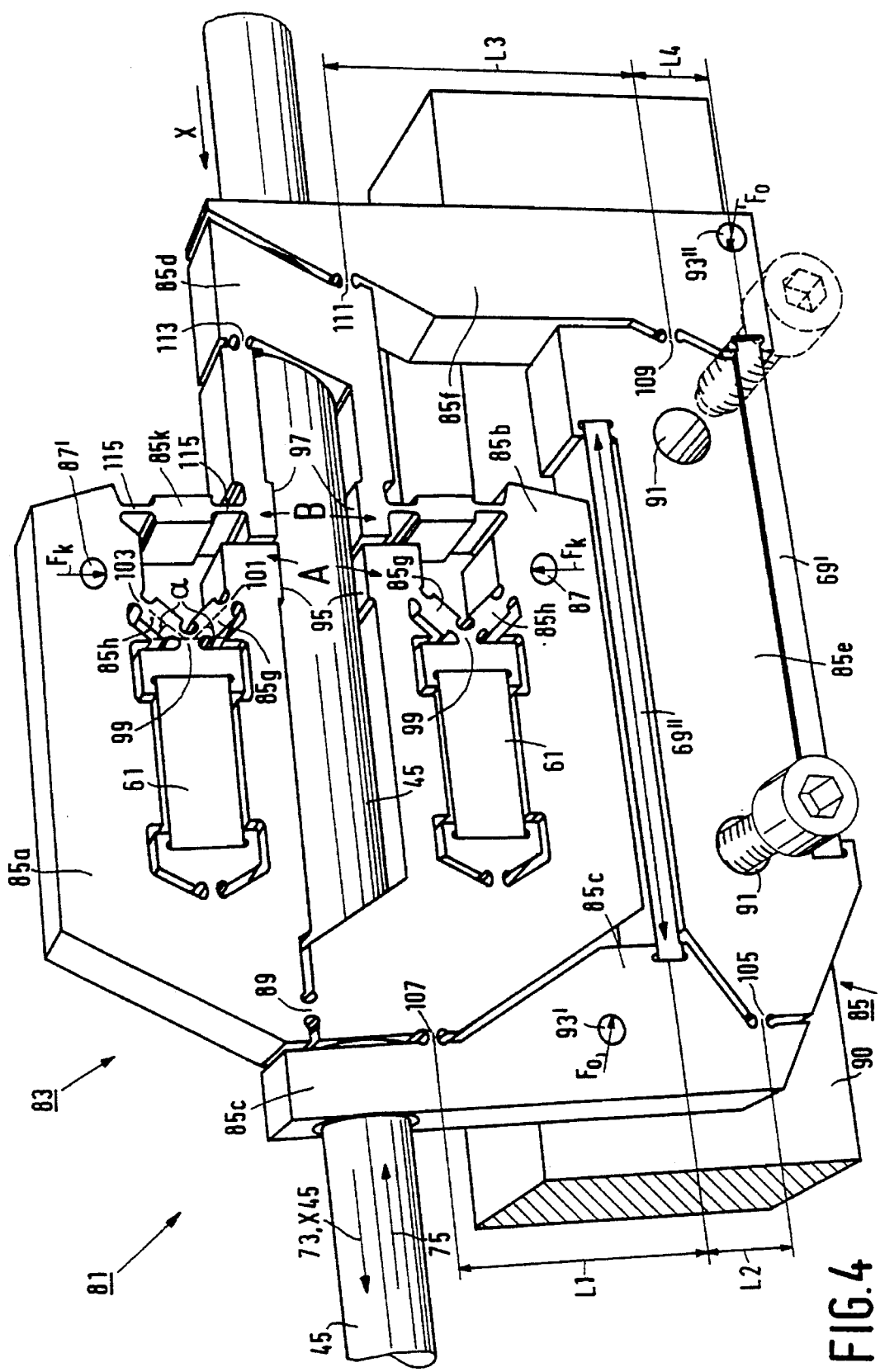
FIG. 4 shows a second embodiment of a displacement device according to the invention.
Figure 6:
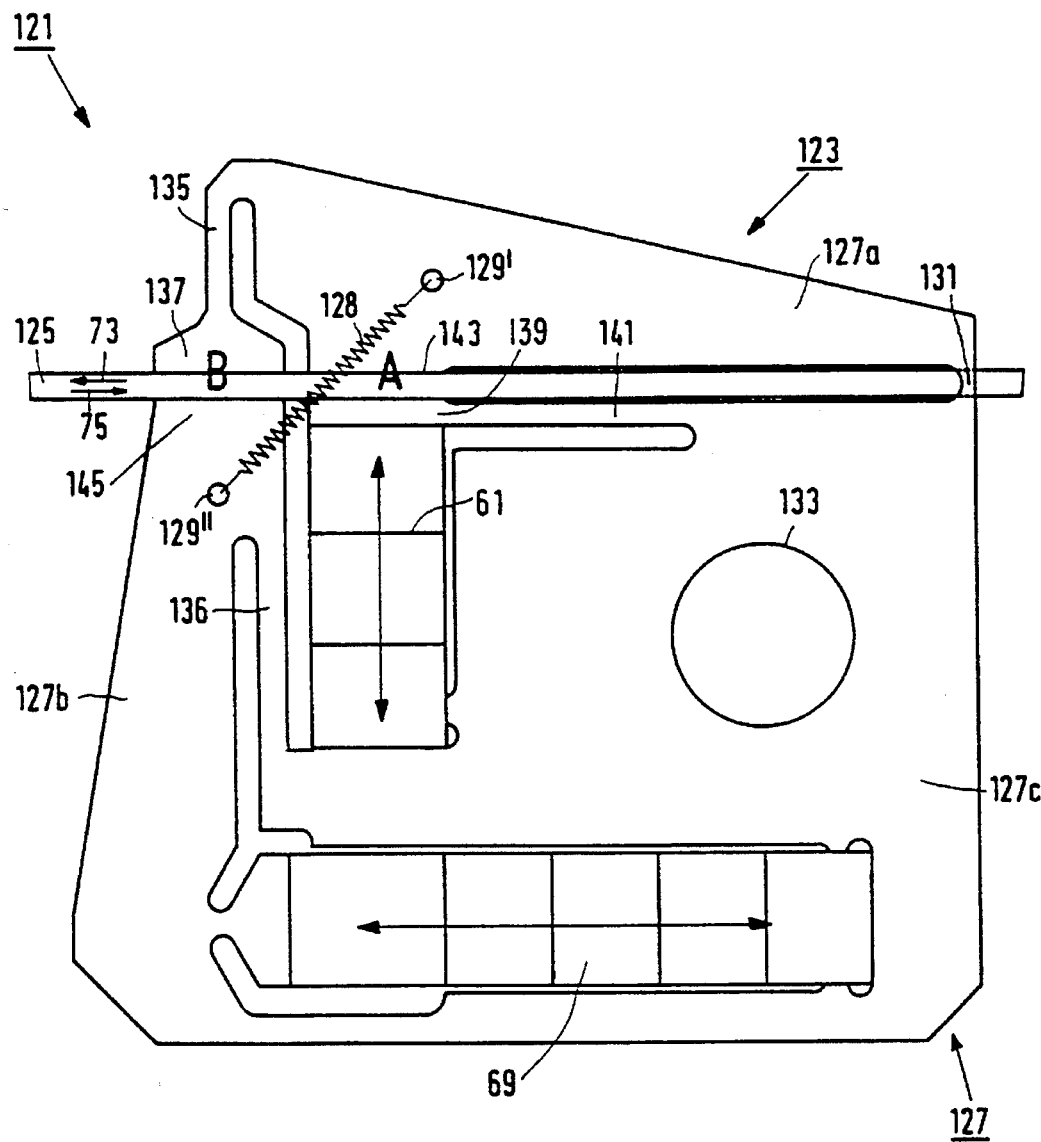
FIG. 6 shows a third embodiment of a displacement device according to the invention.

FIGS. 2a and 2b diagrammatically show the clamping principle according to the invention. The piezoelectric transport element by means of which the clamping members can be displaced relative to one another is not depicted in FIGS. 2a and 2b for simplicity's sake. This element, however, is shown in FIGS. 3, 4 and 6. FIGS. 2a and 2b show a plate 11 in fixed position on which an actuator 15 is mounted. The actuator 15 comprises two clamping members A and B which are interconnected by a bridge 17. The clamping members A and B and the bridge 17 are connected to a support 23 via a lever 19 and a pivot 21. The clamping member B comprises a pin 25, while the clamping member A is provided with a pin 27 and a piezoelectric clamping element 29 fastened to the pin 27. The pin 25 and the clamping element 29 each have a flat end face acting as a clamping surface at the end facing the plate. A mechanical pretensioning force $F_k$ is exerted via the bridge 17, so that the lever 19 rotates in the pivot 21 until one clamping member is pressed against the plate 11 by the clamping force $F_k$. In the situation shown in FIG. 2a, the clamping member B is pressed against the plate 11 by the force $F_k$, while the clamping member A lies at a distance ½s from the plate. To switch the clamping force from the clamping member B to the clamping member A, the piezoelectric clamping element 29 is electrically activated in a usual manner so that the element 29 becomes longer by at least a length s and makes contact with the plate 11, whereby the lever 19 is rotated in a direction indicated by arrow 31 and the clamping member B becomes detached from the plate 11 (see FIG. 2b). Given a length of the element 29 of 6 mm, s may be, for example, 4 μm. The compression force $F_k$ now presses the clamping member A against the plate 11. After the clamping element 29 has been deactivated, the clamping member B is again pressed against the plate 11 owing to the return of the lever 19 by the compression force $F_k$. Usually, only one clamping member will be pressed against the plate in practice. If, however, given an infinitely rigid plate and actuator, the plate 11 with a nominal thickness R at the area of the clamping members A and B has a thicknes differential s owing to tolerances, then the two clamping members A and B will be simultaneously pressed against the plate 11. This will not occur, however, with tolerances usual in practice in that the interspacing b between the clamping members A and B is chosen to be comparatively small. The rigidities of the bridge 17, the lever 19 and the remaining portion of the actuator 15 also play a pan in this connection. Thus, for example, an undesirably strong bending of the bridge 17 can press the two clamping members A and B simultaneously against the plate. In the displacement devices depicted in FIGS. 3, 4 and 6, both the interspacing between the clamping members A and B and the stiffness of the displacement device are so chosen that a single series of clamping members is pressed against the element to be displaced at any time. The actuator 15 shown in FIGS. 2a and 2b is insensitive to thickness variations for which the difference in thickness between the clamping members remains comparatively small. If the thickness change gradient is comparatively small, only one clamping member A or B will be pressed against the plate 11 by the compression force $F_k$ at any time owing to rotation of the lever 19 about the pivot 21. This also takes place when the plate 11 increases in thickness owing to a temperature rise. Given an even wear of the clamping members A and B, the actuator will continue to operate provided the spacing between the plate and the disengaged clamping member remains approximately ½s. The activation of only a single piezoelectric clamping element suffices for switching the clamping force from the one to the other clamping member. In the device shown in FIG. 1, both clamping elements 3 and 5 must be activated in order to switch over the clamping force. However, the clamping member B may be provided with a piezoelectric clamping element in order to increase the length difference between the clamping members A and B whereby the displacement device becomes even more insensitive to thickness tolerances.

FIG. 3 shows a displacement device 41 according to the invention. The displacement device 41 is provided with an actuator 43 and a round shaft 45 which can be displaced by means of the actuator. The actuator 43 is provided with a bush 47 in which the shaft 45 is supported at one side by means of a bronze sleeve bearing bush 49. The bush 47 was formed from an original thin-wailed cylinder which was cut into two bush parts 51, 53 by laser cutting, each bush part 51, 53 being provided with a comb having a number of interleaved fingers 55, 57 acting as blade springs. The bush part 51 has three fingers 55 each provided with a piezoelectric clamping element 59. The bush part 53 has six fingers 57 each provided with a piezoelectric clamping element 61. The clamping elements 59 and 61 are made of the same piezoelectric material, the width b1 of the clamping element 59 being twice the width b2 of the clamping element 61. The three clamping elements 59 constitute a first series of clamping elements, while the six clamping elements 61 constitute a second series of clamping members. The clamping members at the same time act as a bearing for the shaft 45 in radial direction. The clamping elements 59, 61 are fastened on the fingers 55, 57 by means of glue. The clamping elements 59 and 61 are interconnected by means of a clamping ting 63 glued to the clamping elements 59, 61. The clamping ting 63 is provided with plate-shaped coupling pieces 65 between the clamping elements 59 and the clamping elements 61. Owing to a comparatively large dimension in radial direction and a comparatively small dimension in axial direction, the plate-shaped coupling pieces 65 are rigid in the radial direction, while a mutual axial movement of the series of clamping members is possible. The clamping elements 61 are mutually interconnected by means of three plate-shaped bridges 67 which are comparatively thin in radial direction and comparatively wide in axial direction. The length of the plate-shaped bridges 67 in tangential direction is so chosen that, after the actuator 43 has been mounted on the shaft 45, the bridges are slightly stretched and bent in radial direction, so that the fingers of a bush part are pressed against the shaft 45 under a mechanical pretensioning force. The bush parts 51 and 53 are interconnected by means of three piezoelectric transport elements 69 glued to the ends of the bush parts 51 and 53. When the piezoelectric clamping elements 59, 61 and 69 are activated, the length of the clamping elements 59 and 61 in radial direction and the length of the transport elements 69 in axial direction increase. Activation of the piezoelectric elements may take place in a manner known per se such as described, for example, in U.S. Pat. No. 3,902,084. The actuator 43 may, for example, be fastened to a holder (not shown) by the portion 71 of the clamping ring 63 fastened to the clamping elements 59. The holder may be, for example, a housing of a machine or a device. The operation of the displacement device 41 will be explained briefly, starting from a situation in which the portions 71 are fixedly connected to a stationary holder and the fingers 55 are pressed against the shaft 45 by the activated piezoelectric clamping elements 59, while the piezoelectric clamping elements 61 are not activated. The distance between the fingers 57 and the shaft then is s. The clamping elements 59 are longer than the clamping elements 61 by a length s. Then the piezoelectric transport elements 69 are activated, so that they become longer, and the bush part 53 is moved in the direction of the arrow 73. After that the piezoelectric clamping elements 61 are activated and become longer by a length s, while the clamping elements 59 are deactivated and become shorter by a length s. The mechanical pretensioning force is transferred thereby to the clamping elements 61, so that the fingers 57 are pressed against the shaft 45. The difference in length between the clamping elements 59 and 61 then is s. subsequently, the piezoelectric transport elements 69 are deactivated, so that the length of these elements decreases, and the bush part 53 together with the shaft 45 is moved in the direction of the arrow 75. The clamping elements 61 are displaced in axial direction during this from a position to the left of the clamping elements 59 to a position to the right of the clamping elements 59. subsequently, the mechanical pretensioning force is transferred again to the clamping elements 59, and the cycle described above is repeated, whereby the shaft is further displaced in the direction of the arrow 75. To obtain a displacement of the shaft in the direction of the arrow 73, the piezoelectric transport elements 69 should be lengthened when the fingers 57 are pressed against the shaft 45 by the clamping elements 61, and should be shortened when the fingers 55 are pressed against the shaft by the clamping elements 59. The clamping members of both series in the displacement device 41 are provided with piezoelectric clamping elements. This has the advantage that the length difference to be realised between the clamping elements 59 and 61 is twice as large as in the case in which the clamping members of only one series of clamping members are provided with piezoelectric clamping elements. Greater diameter tolerances for the shaft and/or a lower rigidity of the actuator are admissible as a result. The displacement device 41, however, also functions when the clamping members of only one series of clamping members are provided with piezoelectric clamping elements.

FIG. 4 shows a second embodiment of a displacement device according to the invention. The displacement device 81 is provided with an actuator 83 and a round shaft 45 to be displaced by means of the actuator 83. The actuator 83 is provided with a metal plate 85 in which slots are provided by wire spark erosion such that various portions of the plate 85 can be displaced over a comparatively small distance and/or rotated through a comparatively small angle relative to one another. The actuator 83 is further provided with two piezoelectric clamping elements 61 by which a series of clamping members A can be pressed against the shaft 45 and with two piezoelectric transport elements 69', 69" of equal length by which a displacement of the series of clamping members A relative to a second series of clamping members B can be effected. The clamping members A or B are pressed against the shaft 45 under a mechanical pretensioning force, this mechanical pretensioning force $F_k$ being provided by means of a tension spring (not shown) which is fastened in holes 87 and 87'. The mechanical compression force $F_k$ is between 1 and 100N. The holes 87 and 87' are provided in respective plate portions 85a and 85b which are rotatable relative to one another about a so-called elastic hinge 89. Bores in the plate portions 85c and 85d are fitted with sleeve bearing bushes for the shaft 45. Plate portion 85e acts as a carrier which is connected to a holder 90 through the holes 91. The transport elements 69' and 69" connected to the carrier 85e are under a mechanical pretensioning force $F_o$ which is provided by means of a tension spring (not shown) fastened in holes 93' and 93" in respective plate portions 85c and 85f. The pretensioning force $F_o$ prevents the transport elements 69' and 69" from being loaded with tensional force. Each series of clamping members is provided with two flat surfaces which are displaceable relative to one another and which can be clamped against the shaft 45. series A is provided with the clamping surfaces 95 and series B with the clamping surfaces 97. For switching over the clamping force $F_k$ from series B to series A, the clamping elements 61 are activated, so that they increase in length. Owing to the length change, elastic hinges 99 are displaced in the direction of the arrow 75, whereby the plate portions 85g and 85h are rotated about the elastic hinges 99, 101, 103 and displace the elastic hinges 101 towards the shaft and the elastic hinges 103 away from the shaft. The clamping surfaces 95 of the clamping member series A are pressed against the shaft by this. Since the plate portions 85g and 85h are at an angle α of +45° and −45°, respectively, relative to the direction 75 in which the elastic hinge 99 is moved, the increase in the distance between the elastic hinges 101 and 103 is approximately twice (2*tan α) as great as the length change of the clamping element 61.

Displacement of the series of clamping members A relative to the series of clamping members B is realised by means of the two transport elements 69' and 69". Starting from a stationary carrier 85e, plate portion 85c is rotated about elastic hinge 105 in the direction of the arrow 73 when the transport element 69" is lengthened, and the clamping surfaces 95 of the series of clamping members A, which are connected to the plate portion 85c inter alia via elastic hinge 107, are also displaced in the direction of the arrow 73. The displacement of the clamping surfaces 95 is (L1+L2)/L2 times the lengthening of the transport element 69". When the transport element 69' is shortened, the plate portion 85f is rotated about elastic hinge 109 in the direction of the arrow 75, and the clamping surfaces 97 of the series of clamping members B, which are connected to plate portion 85f inter alia via elastic hinge 111, are displaced in the direction of the arrow 75. The displacement of the clamping surfaces 97 is L3/L4 times the shortening of the transport element 69'. A maximum displacement of the clamping surfaces 95 relative to the clamping surfaces 97 is realised when simultaneously transport element 69" becomes longer and transport element 69' becomes shorter.

A radial displacement of the clamping surfaces 97 relative to one another is possible through the elastic hinge 113. An axial displacement of the clamping surfaces 97 relative to the clamping surfaces 95 is also possible by means of the elastic hinges 115 on either side of plate portions 85k.

The operation of the displacement device 81 is now explained briefly, starting from a situation in which the carrier 85e is stationary and the clamping surfaces 97 of the clamping members B are pressed againt the shaft 45. The distance between the clamping surfaces 95 and the shaft 45 is ½s. Now the transport element 69" is lengthened while the transport element 69' is shortened. This moves the freed clamping members A in the direction of the arrow 73 and the clamping members B together with the shaft 45 in the direction of the arrow 75. Then the piezoelectric clamping elements 61 are activated, whereby the mechanical pretensioning force $F_k$ is transferred to the series of clamping members A, the clamping surfaces 95 being pressed against the shaft 45. The distance between the elastic hinges 101 and 103 becomes greater by a lenth s, so that the spacing between the clamping surfaces of the clamping members B becomes ½s. Then the transport element 69' is lengthened, while the transport element 69" is shortened. The freed clamping members B are moved in the direction of the arrow 73 by this, and the clamping members A together with the shaft 45 are moved in the direction of the arrow 75. subsequently, the mechanical pretensioning force is transferred to the clamping surfaces 97 again, and the cycle described above is repeated, so that the shaft 45 is moved further in the direction of the arrow 75. To obtain a displacement of the shaft 45 in the direction of the arrow 73, the transport element 69' is to be lengthened and the transport element 69" to be shortened at the moment at which the clamping members B are pressed against the shaft 45, while the transport element 69" is to be lengthened and the transport element 69' to be shortened at the moment at which the clamping members A are pressed against the shaft 45. since both series of clamping members A and B are connected to the stationary carrier 85e via a piezoelectric transport element, a displacement is carried out by the shaft 45 both during clamping of series A and during clamping of series B. As a result, the displacement of the shaft 45 as seen in time is more regular than if a displacement of the shaft were carried out only during clamping of one series of clamping members.

Figure 5:
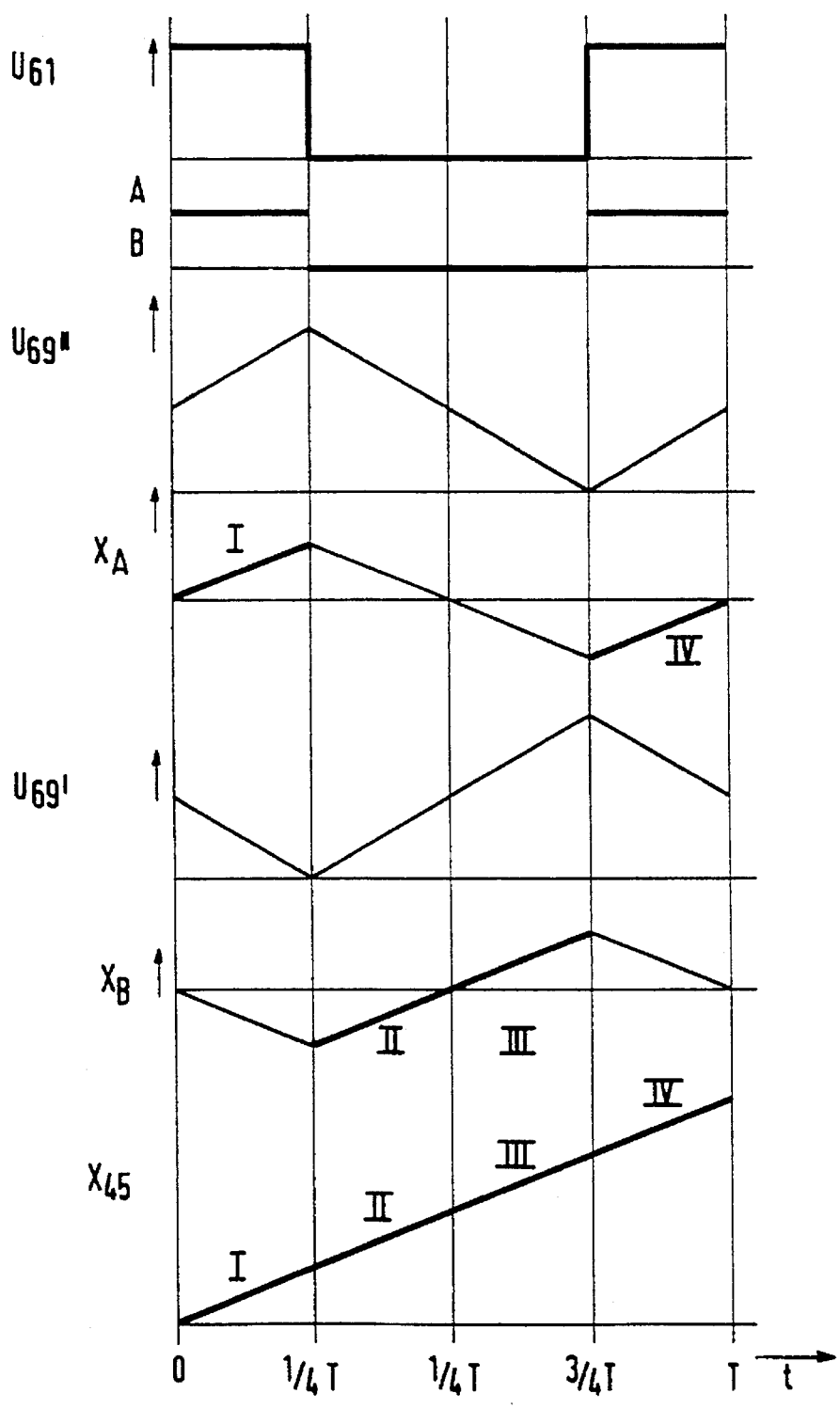
FIG. 5 shows time diagrams of the voltages applies to the various piezoelectric elements and of the displacements of the clamping members and the element to be displaced in the second embodiment of the displacement device as shown in FIG. 4.

FIG. 5 shows time diagrams of voltages $U_{61}$, $U_{69''}$ and $U_{69'}$ at the clamping elements 61 and the transport elements 69" and 69', respectively, of the clamping actions of the clamping members A and B, and of the displacement $X_A$, $X_B$ and $X_{45}$ of the clamping members A and B and the shaft 45 to be displaced, respectively, of the device depicted in FIG. 4. During the first quarter of a cycle O ¼T, the clamping members A clamp against the shaft 45 and the shaft 45 together with the clamping members A is displaced in the X-direction corresponding to the arrow 73. In the second and third quarters of a cycle ¼T–2¾T, respectively ¼T– ¾T the clamping members B are clamped against the shaft 45 and the shaft 45 together with the clamping members B is moved further in the X-direction. In the fourth quarter of a cycle ¾T-T, the clamping members A are pressed against the shaft 45 again, and the shaft is displaced still further in the X-direction. The displacement per cycle T is 1–10 μm and the frequency with which the clamping action is switched from the one series of clamping members to the other series is 100–10000 Hz, so that a displacement velocity of 0.1 to 100 mm/s can be achieved.

FIG. 6 shows a third embodiment of a displacement device according to the invention. The displacement device 121 is provided with an actuator 123 and a flexible metal plate 125 which can be displaced by means of the actuator 123. The actuator 123 comprises a metal plate 127 in which slots are provided by wire spark erosion so that various portions of the plate 127 are displaceable over a comparatively small distance and/or rotatable through a comparatively small angle relative to one another. The actuator 127 is further provided with a single piezoelectric clamping element 61 by which a series of clamping members A can be pressed against the flexible plate 125, and provided with a single piezoelectric transport element 69 by which a displacement of the series of clamping members A relative to a second series of clamping members B can be carried out. The clamping members A, B have flat end faces acting as clamping surfaces at their ends facing the plate 125. The clamping members are pressed against the plate 125 under a mechanical pretensioning force $F_k$ by means of a tension spring 128 fastened in holes 129' and 129". The tension spring 128 also provides a pretensioning force on the transport element 69. The holes 129' and 129" are provided in respective plate portions 127a and 127b which are rotatable relative to one another about two elastic hinges 131 (of which only one is visible in the Figure). In the plate 127 there is a slot which extends in a plane transverse to the plane of FIG. 6, is situated behind the elastic hinge 131 and has a length slightly greater than the width of the plate 125 to be displaced. A hole 133 is provided in a plate portion 127c so that the actuator 123 can be fastened to a fixed holder. The clamping member 137 of series B is displaceable relative to the clamping members A in the direction of the arrows 73, 75 thanks to a portion 135 which acts as a blade spring. The clamping member 145 of series B is displaceable relative to the clamping members A in the direction of the arrows 73, 75 thanks to a portion 136 acting as a blade spring. The operation of the displacement device 121 is as follows. The starting situation is one in which plate portion 127c is connected to a fixed holder, the series of clamping members B being pressed against the flexible plate 125 and the total distance between the plate 125 and the clamping members 139 and 143 being ½s. Now the piezoelectric transport element 69 is activated, whereby it increases in length. The series of clamping members B together with the flexible plate 125 is displaced in the direction of arrow 73. After that the piezoelectric clamping element 61 is activated, whereby it increases its length by a value s, and the clamping member 139 fastened to a blade spring 141 is displaced in the direction of plate portion 127a until the mechanical pretensioning force has been transferred to the series of clamping members A and a total distance ½s between the clamping members B and the plate 125 is created. The deactivation of the piezoelectric transport element 69 causes its length to decrease and moves the series of clamping members B in the direction of arrow 75. subsequently, the mechanical pretensioning force is transferred to the clamping members B again and the cycle described above is repeated, whereby the flexible plate 125 is further moved in the direction of the arrow 73. The device 121 is particularly suitable for displacing flexible elements because a flexible element adapts itself to the positions of the series of clamping members A and B, so that little wear is generated in the clamping members 137, 139, 143, 145. Obviously, it is also possible in the devices 41, 81 and 121 to have the shaft or the flexible plate remain stationary and to displace the holder relative to a stationary shaft or plate.

The displacement device operates not only with two series of clamping members, but also with only two clamping members which are clamped alternately against the element to be displaced. If the element is, for example, a shaft, the shaft may be supported at a side opposite the clamping members by a duct, a saddle or a bearing.

Piezoelectric elements are used in the embodiments shown. The clamping and/or transport elements may alternatively be made from electrostrictive or magnetostrictive materials.

The invention is not limited to translatory displacement systems. It is alternatively possible to have a shaft perform a rotational movement about the centreline of the shaft by means of an electromechanical displacement device according to the invention. For this purpose, the clamping members must be so arranged that the clamping members are mutually displaceable in tangential direction, while the transport element must be capable of lengthening in tangential direction.

We claim:

1. An electromechanical displacement device provided with a holder, a round shaft displaceable relative to the holder, and an actuator connected to the holder and capable of displacing the shaft relative to the holder, wherein the actuator is provided with two series of clamping members which can be clamped against the displaceable shaft, while each member of at least one series of clamping members is provided with a clamping element of transducer material, and which actuator is further provided with a series of transport elements of transducer material by which the distance between the series of clamping members can be changed while one series of clamping members is connected to the displaceable shaft with clamping force, wherein the improvement comprises that the first series of clamping members is clamped against the displaceable element with a mechanical pretensioning force exerted on the actuator by mechanical pretensioning means while the second series of clamping members is disengaged from this element, and the mechanical pretensioning force is transmitted to the second series of clamping members through activation of the clamping elements, the second series of clamping members being clamped against the displaceable element with the mechanical pretensioning force while the first series of clamping members is disengaged from this element, wherein the two series of clamping members are interconnected by means of a ring which concentrically surrounds the shaft and which is provided with plate-shaped bridges which lie between clamping members of a single series, which are flexible in radial direction, and by which the pretensioning force is transmitted to the clamping members, and in that the actuator is provided with plate-shaped coupling pieces situated between clamping members of different series and flexible in axial direction.

2. An electromechanical displacement device provided with a holder, an element displaceable relative to the holder, an actuator connected to the holder and capable of displacing the element relative to the holder, which actuator is provided with at least a first and a second clamping member which are arranged separately from one another and can be clamped against the displaceable element, while at least one clamping member is provided with at least one clamping element of transducer material, and which actuator is further provided with a transport element of transducer material by which the distance between the clamping members can be changed while one clamping member is connected to the displaceable element with clamping force, wherein the improvement comprises that the first clamping member is clamped against the displaceable element with a mechanical pretensioning force exerted on the actuator by mechanical pretensioning means while the second clamping member is disengaged from this element, and the mechanical pretensioning force is transmitted to the second clamping member through activation of the clamping element, the second clamping member being clamped against the displaceable element with the mechanical pretensioning force while the first clamping member is disengaged from this element, wherein the device is further provided with a carrier connected to the holder and with two transport elements of equal length made of transducer material, one of these elements being connected from the carrier to the first clamping member while the other element is connected from the carrier to the second clamping member, whereby a displacement of the displaceable element is carried out both during clamping of the first and during clamping of the second clamping members.

3. An electromechanical displacement device, comprising:
(a) a holder,
(b) a displaceable element displaceable in a first direction relative to a given axis of the displaceable element and relative to the holder,
(c) an actuator connected to the displaceable element and capable of displacing the element in the first direction relative to the holder when activated, said actuator comprising:
(i) first and second clamping members spaced apart a given distance with respect to the given axis and which are arranged separately from one another and each of which has a clamping surface that can be selectively clamped against and disengaged from the displaceable element by a movement in a second direction,
(ii) at least one clamping member comprising a clamping element of transducer material for causing its clamping surface to move in the second direction,
(iii) a transport element of transducer material which when activated will cause the given distance between the clamping members to change,
(d) mechanical pretensioning means mounted on the holder for movement in the second direction and engaging the actuator for continuously applying to the actuator a pretensioning force in the second direction for causing one of the first and second clamping members via its clamping surface to engage the displaceable element with a pretensioning force while the other of the first and second clamping members is disengaged from the displaceable element, and for causing the other of the first and second clamping members via its clamping surface to engage the displaceable element with a pretensioning force while the one of the first and second clamping members is disengaged from the displaceable element.

4. An electromechanical displacement device, comprising:
(a) a holder,
(b) a displaceable element displaceable in a first direction parallel to a given axis of the displaceable element relative to the holder,
(c) an actuator connected to the displaceable element and capable of displacing the element in the first direction relative to the holder when activated, said actuator comprising:
(i) first and second clamping members spaced apart a given distance with respect to the given axis and which are arranged separately from one another and each of which has a clamping surface that can be selectively clamped against and disengaged from the displaceable element by a movement in a second direction transverse to the first direction,
(ii) at least one clamping member comprising a clamping element of transducer material for causing its clamping surface to move in the second direction,
(iii) a transport element of transducer material which when activated will cause the given distance between the clamping members to change when only one of the clamping members has its clamping surface clamped against the displaceable element with a clamping force,
(d) means for supporting the actuator in the absence of activation of the element of transducer material for movement in the second direction and for continuously applying to the actuator a pretensioning force in the second direction for causing only one of the first and second clamping members via its clamping surface to engage the displaceable element with a pretensioning force when the other of the first and second clamping members is disengaged from the displaceable element, and for causing only the other of the first and second clamping members via its clamping surface to engage the displaceable element with a pretensioning force when the one of the first and second clamping members is disengaged from the displaceable element.

5. The device of claim 4, wherein the means for supporting the actuator comprises a pivotally-mounted lever positioned laterally of the first and second clamping members and sized such that (a) when the one of the first and second clamping members has its clamping surface engaged to the displaceable element, the other of the first and second clamping members is automatically disengaged from the displaceable element, and (b) when the other of the first and second clamping members has its clamping surface engaged to the displaceable element, the one of the first and second clamping members is automatically disengaged from the displaceable element.

6. The device of claim 4, wherein said first and second clamping members each comprises a series of clamping members.

7. The device of claim 6, wherein the displaceable element comprises a round shaft, further comprising a ring member surrounding the shaft and interconnecting the series of first and second clamping members, said ring member comprising laterally-flexible plate-shaped bridge members which interconnect clamping members of a series and provide the pretensioning force, said actuator comprising axially-flexible plate-shaped coupling pieces which interconnect clamping members of different series.

8. The device of claim 4, wherein the given distance is smaller than the axial length of the transport element.

9. The device of claim 9, wherein the means for supporting the actuator comprises resilient means.

* * * * *